United States Patent [19]

Marshall et al.

[11] Patent Number: 4,480,672
[45] Date of Patent: Nov. 6, 1984

[54] ANTIVIBRATION TRACTOR TIRE

[75] Inventors: Kenneth D. Marshall, Broadview Heights; Michael A. Berzins, Brecksville, both of Ohio

[73] Assignee: The B. F. Goodrich Company, Akron, Ohio

[21] Appl. No.: 512,842

[22] Filed: Jul. 11, 1983

[51] Int. Cl.³ .............................................. B60C 11/08
[52] U.S. Cl. ........................... 152/209 B; 152/209 D; D12/137; D12/146
[58] Field of Search ........... 152/209 B, 209 R, 209 A, 152/209 NT, 209 WT, 209 D; D12/136, 137, 146, 147, 140

[56] References Cited

U.S. PATENT DOCUMENTS

| D. 62,172 | 4/1923 | Paull | 152/209 D |
|---|---|---|---|
| D. 104,492 | 5/1937 | Brunner | 152/209 D |
| D. 117,175 | 10/1939 | Hardeman | 152/209 D |
| D. 167,381 | 7/1952 | Thaden | 152/209 D |
| D. 168,364 | 12/1952 | Martin | 152/209 D |
| 2,324,996 | 7/1943 | Coben | 152/209 B |
| 2,403,309 | 7/1946 | Smith | 152/209 B |
| 2,571,922 | 10/1951 | Morrison | 152/209 B |
| 2,626,649 | 1/1953 | Eiler et al. | 152/209 B |
| 3,587,703 | 6/1971 | Hanus | 152/209 B |
| 3,603,370 | 9/1971 | Hylbert et al. | 152/209 B |
| 4,383,567 | 5/1983 | Crum et al. | 152/209 B |

Primary Examiner—William A. Powell
Assistant Examiner—Thomas Bokan
Attorney, Agent, or Firm—Vincent A. Greene; Harry F. Pepper, Jr.; Alfred Lobo

[57] ABSTRACT

A tractor tire is disclosed having widely spaced lug pairs with a symmetrical Y-shaped footprint, each lug pair having inclined transverse lugs and an elongated longitudinal nose portion at the peripheral centerline providing a central lug projecting in the direction of tire rotation and overlapping the trailing end portions of the next adjacent lug pair. The unique lug arrangement minimizes vibration to improve safety during operation on the highway while retaining the characteristics required for effective off-the-road (OTR) performance on soft ground.

4 Claims, 5 Drawing Figures

ANTIVIBRATION TRACTOR TIRE

BACKGROUND OF THE INVENTION

This invention relates to heavy duty off-the-road (OTR for brevity) tires of the type used on farm tractors and heavy construction vehicles and more particularly to an improved tread design which reduces vibration during high speed operation on hard surfaces.

Agricultural tractors, graders, log-skidders and other OTR vehicles normally experience severe vibrational problems when traveling on hard surfaces, such as paved highways or packed fields. The problem is largely due to the lugs which are arranged for effective OTR operation on soft ground.

The tread designs which have been preferred for OTR tires provide high traction in soft ground and expulsion of the earth from the transverse recesses between the deep lugs of the tread. Over the years many different lugged tires have been employed which meet these requirements and which provide the durability and long life needed for a commercial product. However, the commercial tire tread designs for lugged OTR tires have not provided optimum riding qualities on highway surfaces.

Because of the rigidity of the ordinary farm tractor and the absence of shock absorbing systems such as are used on passenger cars and other highway vehicles, it can be dangerous to operate such a tractor at substantial speeds, such as 20 to 25 miles per hour. This is particularly true when using conventional OTR tires with deep widely spaced lugs which cause severe pounding and vibration in contact with a hard highway surface. This is one important reason that farm tractors usually operate on the highway at slow speeds below 15 miles per hour.

At higher speeds the vibration caused by conventional OTR tires can become intolerable. When using widely spaced lugs, large radial forces are transferred to the wheel axle because of concentration of tire load at the tip of each lug as it moves into contact with the road. With the usual curved tread profile and a herringbone lug arrangement, the rolling radius of the tire decreases as the load is progressively transferred toward the outer side portions of the tread, and, when the next lug contacts the road, the rolling radius is suddenly increased. The cyclic motion produced in this manner results in large forces applied to the driven wheel axle in a vertical direction and also large tractive forces resisting rotation of the tire.

With the conventional lug arrangements the vibration problems are much more serious at high speeds due to the cyclic movement of the center of tire pressure from one side of the peripheral centerline of the tread to the other. Vibration tests show that such cyclic movement causes large forces and moments to be developed at the wheel axle and that these can be accentuated as the result of resonance effects at certain rotational speeds.

Many different lug arrangements have been proposed for OTR tires, and some of the tires have performed satisfactorily on highway surfaces, but the practical lug designs which have met with commercial acceptance for OTR use because of good traction and effective operation on soft ground have caused vibration problems when the tires are operated at high speeds on hard highway surfaces.

It is difficult to provide a tire suitable for highway use which meets the requirements of effective OTR use, particularly the requirements as to traction and earth removal. Tread designs have been proposed with a continuous circumferential rib at the crown but these are unacceptable for the driving wheels of a tractor because of the inability to provide adequate traction. Closely spaced lugs reduce the vibration problems but are unacceptable for OTR tires because of inadequate traction and inability to provide efficient removal of earth from between lugs. For these and other reasons, the commercial OTR tread designs have employed deep widely spaced lugs which are not well suited for high speed operation on paved highways.

SUMMARY OF THE INVENTION

The present invention provides a simple and effective solution to the vibration problem using a unique lug design wherein lug pairs of Y-shaped arrangement ae regularly spaced around the periphery of the tire in a herringbone pattern. The transverse lugs are symmetrical with respect to the peripheral centerline of the tread, and a longitudinal nose lug is provided at the tread center which extends along the centerline and overlaps the axial line through the trailing ends of the next adjacent lug pair. The overlapping Y-shaped lug design makes it possible to minimize vibration forces during operation of the tire at substantial speeds on the highway and at the same time to provide widely spaced deep lugs with excellent OTR characteristics.

The lug arrangement according to the prevent invention employs transverse lugs in each lug pair which are inclined at an angle of from 40° to 60° relative to the peripheral centerline of the tread and which are spaced from the transverse lugs of the next lug pair a distance several times the lug width. In this arrangement each lug pair comprises a short lug with a length which may be about half the tread width and a long lug with a length at least about two-thirds the tread width with a longitudinal nose portion projecting in the direction of tire rotation. The improved tread design makes it possible to obtain substantial overlapping of adjacent lug pairs while maintaining a substantial circumferential spacing between the lug pairs.

In one preferred embodiment of the invention (see FIG. 2) the straight transverse lugs are inclined at an angle of from 40 to 45 degrees relative to the peripheral centerline of the tread so that a substantial overlap may be provided even where the peripheral spacing of the lug pairs is substantially greater than half the width of the tread. Each longitudinal nose portion of a lug pair (20 or 21) overlaps the trailing ends of the adjacent lug pair a distance from 0.05 to 0.25 times the tread width. This embodiment of the invention is particularly well suited for operation of the OTR tire on a paved highway at high speeds.

In another preferred embodiment of the invention (see FIG. 4), the transverse lugs are inclined at an angle of from 50 to 60 degrees relative to the peripheral centerline so that there can be effective removal of earth from between the transverse lugs even when the spacing between lug pairs is less than that normally provided. In this embodiment the peripheral spacing of the lug pairs may be substantially less than half the width of the tread. The unique lug arrangement is such that each longitudinal nose portion provides support at the crown of the tread and overlaps the trailing ends of the adjacent lug pair a distance from 0.05 to 0.2 times the tread width. The close spacing of the lug pairs greatly improves the performance of the tire on the highway and permits the use of narrow flexible lugs which help in removal of earth retained on the lugs.

It is an object of the invention to provide a tread construction for OTR tires which has the qualities essential for operation on soft ground and which minimizes the vibrational forces transmitted to the axle during operation on a hard surface.

Another object of the invention is to provide an OTR tire of simple inexpensive construction which permits high-speed operation on paved highway surfaces.

A further object of the invention is to improve highway safety by permitting operation of OTR vehicles at higher speeds.

BRIEF DESCRIPTION OF THE DRAWINGS

The foregoing and other objects and advantages of the invention will appear more fully from the following description, made in connection with the accompanying drawings of preferred embodiments of the invention, wherein like reference characters refer to the same or similar parts throughout the several views and in which.

DETAILED DESCRIPTION OF PREFERRED EMBODIMENTS

Figure 1:
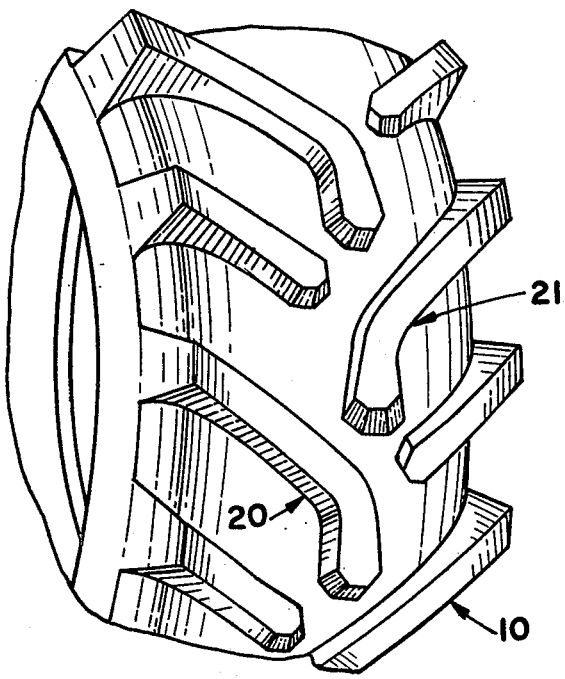
FIG. 1 is a partial perspective view on a reduced scale showing a tractor tire constructed in accordance with the present invention.
Figure 2:
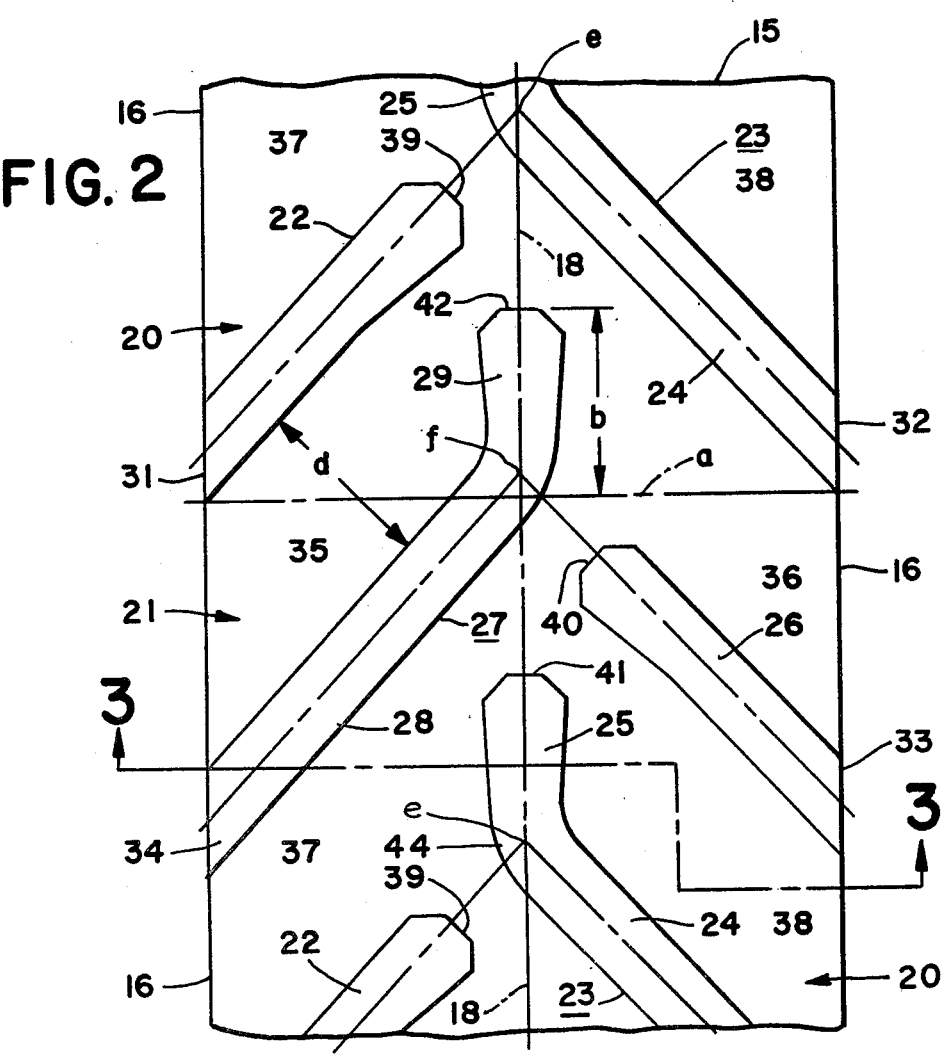
FIG. 2 is a plan view of a section of the tread of the tire of FIG. 1.
Figure 3:
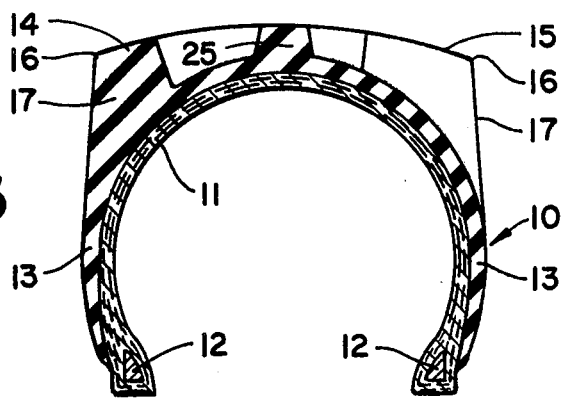
FIG. 3 is a cross-sectional view taken substantially along lines 3—3 of FIG. 2.

Referring more particularly to the drawings, in which like parts are identified by the same numerals, FIGS. 1 to 3 show a pneumatic rubber tractor tire 10 constructed in accordance with the present invention having a conventional reinforced carcass 11 with beads 12 for engaging the wheel rim and sidewall portions 13 which extend between the beads and the peripheral tread portion 14. The outer surface of the tread is located in a surface of revolution 15 with side edges 16 at the tread shoulders 17 parallel to the peripheral centerline 18 of the tire. The surface 15 may be generally cylindrical with a flattened profile but preferably has a slight curvature in axial cross-section with a crown at the centerline 18 (see FIG. 3).

The tread portion comprises a series of lug pairs 20 and 21 regularly spaced around the periphery of the tire in a herringbone pattern, each pair preferably being the same as the next adjacent pair but of opposite hand and having a Y-shaped footprint. The lugs shown in the various embodiments of the invention may be sized and proportioned as in the drawings which are drawn to scale, but it will be understood that the size, shape and spacing of the lugs and the construction of the tire may vary considerably depending on the operating characteristics which are sought.

In the illustrative embodiment of FIGS. 1 to 3, each lug pair 20 consists of a short transverse lug 22 and a long lug 23 with a straight transverse portion 24 and a longitudinal nose portion 25 at the crown of the tread. Each lug pair 21 is of similar construction and consists of a short transverse lug 26 and a long lug 27 of the same size as the lugs 22 and 23, respectively, but of opposite hand. Each lug 27 has a straight transverse portion 28 parallel to the lugs 22 and a longitudinal nose portion 29 at the centerline 18 in alignment with the nose portions 25 of the adjacent lugs 23. As shown herein the lugs 22, 23, 26 and 27 have flat end faces 31, 32, 33 and 34, respectively, located at the side edges of the tread shoulders. A symmetrical Y-shaped arrangement is preferably provided so that faces 31 and 32 are in axial alignment, faces 33 and 34 are in axial alignment, and lug portions 25 and 29 are in longitudinal alignment and symmetrical with respect to the centerline 18.

A wide spacing may be provided between the lugs. Each of the short lugs 22 on one side of the centerline 18 is spaced from the next long lug 27 a distance d (FIG. 2) at least several times the width of the lug 22, and the same is true of the lugs 26 on the opposite side. This provides wide recesses 35, 36, 37 and 38 between the lugs. The front end face 39 of each lug 22 is spaced from the lug 23 to prevent the earth from packing behind the nose portion 25 and to facilitate earth removal, and the end face 40 of each lug 26 is spaced from the lug 27 for a similar reason.

Each of the nose portions 25 and 29 of the main lugs 23 and 27 is spaced a substantial distance from the lugs of the adjacent lug pair so as to improve operation on soft ground. Such distance is greater than the width of the short lugs and preferably sufficient to prevent the earth from packing in front of the nose portion.

As shown the nose portion 25 has a front end face 41 and the nose portion 29 has a similar end face 42. The axial line 1 through the trailing ends of each lug pair crosses the lug portion 25 and 29 as indicated in FIG. 2 and is spaced from the end face 41 or 42 a distance corresponding to the overlap b of the adjacent lug pairs. The overlap is from 0.05 to 0.25 times the width of the tread and depends on the overall lug arrangement.

Stated in another way, the overlap b is the difference between the overall length of each lug pair 20 or 21 and the peripheral spacing between the adjacent lug pairs. Said overall length is the longitudinal distance from lateral line a (through the trailing edges of the transverse lugs of a lug pair) to the front face (41 or 42) of the nose portion of that lug pair. The peripheral spacing between the Y-shaped lug pairs 20 or 21 is the longitudinal distance between the trailing edges of said pairs or between corresponding points on adjacent pairs (i.e., between faces 41 and 42).

FIG. 2 indicates that the straight transverse lugs of the lug pairs 20 and 21 are preferably inclined at substantially the same angle relative to the peripheral centerline 18 and that the centerlines of the transverse lugs preferably intersect at points e and f on the line 18.

The length of each nose portion 25 or 29 is the longitudinal distance from point e or f, respectively, to the front face 41 or 42. Such length is perferably no more than half the longitudinal distance between points e and f so that the nose portions of all of the lug pairs in the tread occupy no more than half the circumference of the tread. This arrangement provides good traction and helps prevent earth from packing in the vicinity of the nose portions.

The inclination of the straight transverse lugs relative to the peripheral centerline 18 in the tread of the invention may vary and is preferably from 40 to 60 degrees. The preferred size and shape of the lugs depends somewhat on the inclination. However, it is usually preferable to employ straight short lugs 22 and 26 with a length from 4 to 6 times its average width and an average width in the range of from 0.08 to 0.12 times the tread width measured between the side edges 16. The long lugs 23 and 27 usually have an average width in the same range and about the same as that of the short lugs. It is usually preferable to employ long lugs shaped like a hockey stick with a bend 44 at the tread crown and having a length from 7 to 12 times its average width and at least two-thirds the width of the tread.

In the preferred embodiment of FIGS. 1 to 3, wherein the transverse lugs are inclined at an angle of from 40 to 45 degrees relative to the peripheral centerline 18 of the tread, the peripheral spacing of the lug pairs 20 and 21 (i.e. measured from point e to point f) is usually greater than two-fifths of the tread width and may be from about one-half to three-fourths the tread width. The overall length of each lug pair may be from about 0.6 to 0.9 times the tread width to provide a substantial overlap from 0.05 to 0.25 times the tread width and preferably at least 0.1 times the tread width.

The embodiment of FIGS. 1 to 3 provides an outstanding combination of properties with excellent traction and good earth removal characteristics for OTR use on soft ground and with good symmetry and excellent antivibration characteristics for highway travel.

The durability of the tread can be improved by tapering the side and end faces of the lugs as indicated, for example, in FIGS. 1 and 3 so that the lug has greater thickness at the base than at the road-engaging surface. The preferred shape of the road-engaging surface is indicated in the plan view of FIG. 2, which is drawn substantially to scale. The forward end of each lug is preferably tapered as indicated or otherwise thickened to provide additional strength, but this is not essential. The depth of the transverse lugs preferably increases from the center to the side of the tread 14 and the lugs may, for example, have a depth at the tread shoulders from 1.5 to 4 times the average width of the lug. The average depth of the transverse lugs depends on the intended use of the tire and may, for example, be more than two-thirds of the lug width. The depth of the nose portion 25 to 29 is less than the average depth of the transverse portions and may, for example, be greater than half the average width of the transverse lugs in a tire of the type shown herein. In other tires, deeper lugs may be preferred.

The smooth riding qualities of the tire may sometimes be improved by providing a tread of flattened profile or one with a slightly curved profile such as to reduce vertical vibrations due to the change in diameter as the pressure is transferred from the center towards the sides of the tread. The reduction in curvature of the axial cross section of the tread results in increased depth at the tread shoulders to improve traction but this advantage is partially offset by the increased cost of the rubber when using a carcass of the above shown in FIG. 3.

The present invention applies to radial tires as well as bias-ply tires. The latter provide less rolling resistance and better traction due to an increase in the contact area with the ground. In some cases the circumscribed contact area for the radial tire can be about 20 percent greater than that for a bias tire of the same size.

Figure 4:
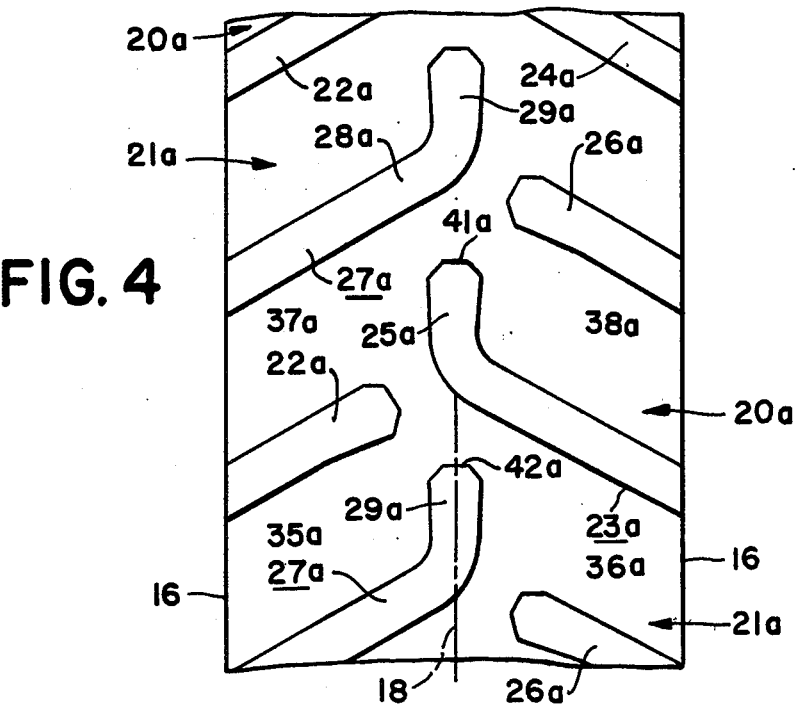
FIG. 4 is a plan view of an alternate embodiment of the tread of a tire constructed according to the invention.

The advantages described above with respect to radial tires and tires of flattened profile apply also to the second preferred embodiment shown in FIG. 4 wherin the parts corresponding to those of the previous embodiment are identified by the same numerals with the letter a added. In the preferred embodiment a close spacing of the lug pairs is obtained when the transverse lugs of the lug pairs 20a and 21a are inclined at an angle from 50° to 60° relative to the peripheral centerline 18. FIG. 4 is drawn to scale to illustrate the invention, but it will be understood that the size and location of the lugs may vary. For example, the average width of the lugs may be one-tenth of the tread width or less because of close spacing. The distance d from each transverse lug to the next adjacent transverse lug as indicated in FIG. 4 is preferably at least 3 times the average width of the lug to assure efficient operation on soft ground. The straight lugs facilitate earth removal from the recesses between lugs and permit close spacing between lug pairs. The peripheral spacing between lug pairs 20a and 21a may be substantially less than half the tread width. The lug arrangement makes it possible to minimize the amount of rubber and to make a tire wherein the total volume of the spaces between the lugs is almost 3 times the volume of the rubber forming the lugs even where the lugs are closely spaced.

The close spacing of the lug pairs can significantly improve the operation of the tire on the highway and makes possible a small reduction in the width of the lugs. The resulting increase in flexibility under load can facilitate removal of the earth retained in the recesses between lugs.

Figure 5:
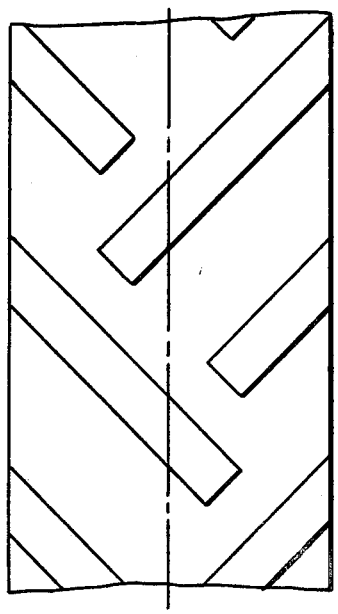
FIG. 5 is a plan view showing a known tread construction.

The unique OTR tread design of the present invention includes features having some resemblance to tread designs of the prior art. The treads of U.S. Design Pat. Nos. D-62,172, D-104,492; D-117,175; D-167,381 and D-168,364 or U.S. Pat. Nos. 2,324,996; 2,403,309; 2,571,922; 2,626,649; 3,587,703; 3,603,370 and 4,383,567 can be considered pertinent. The latter patent and FIG. 5 illustrate prior art OTR tread designs employing alternating long and short lugs with long lugs extending across the center of the tread. U.S. Pat. No. 2,403,309 and U.S. Design Pat. No. 62,172 disclose symmetrical lug arrangements with a continuous central rib which assures proper support on hard surfaces. However, the patents do not suggest a symmetrical lug arrangement for a tractor tire which provides the traction and earth removal characteristics essential for effective operation on soft ground combined with the high speed antivibration characteristics of a symmetrical tread as is the case with the unique OTR tire treads of the present invention.

We claim:

1. A pneumatic tire for tractors and other off-the-road vehicles having a tread comprising a series of y-shaped lug pairs spaced around the periphery of the tire comprising transverse alternating long and short lugs at each side of the peripheral centerline of the tire, each of said transverse lugs having a length at least several times its width, is spaced from the transverse lugs of the next adjacent lug pair a distance at least several times its width and extends inwardly from the outer sides of the tread inclined at substantially the same angle of between 40° to 60° relative to said centerline, each of said long lug having a longitudinal nose portion extending, in the intended direction of rotation of the tire, along and disposed substantially symmetrical with respect to said centerline, each of said nose portions overlapping the trailing end of the next adjacent lug pair to receive the load as it is transferred from said end portions, and being spaced from the nose portion of the next adjacent lug pair to provide an earth-receiving recess therebetween and such that said nose portions of all of said long lugs collectively occupy no more than about half the circumference of the tread along said centerline.

2. A pneumatic tire according to claim 1 wherein each short lug has a length at least four times its width and each long lug has a length at least two-thirds the tread width.

3. A pneumatic tire according to claim 1 wherein the transverse lugs are inclined at an angle of from about 40 to about 45 degrees relative to the peripheral centerline of the tread, the peripheral spacing of the lug pairs is at least about half the width of the tread, and each longitudinal nose portion overlaps the trailing ends of the adjacent lug pair a distance up to 0.25 times the tread width.

4. A pneumatic tire according to claim 1 wherein the transverse lugs are inclined at an angle of from about 50 to about 60 degrees relative to the peripheral centerline of the tread, the peripheral spacing of the lug pairs is less than half the width of the tread, and each longitudinal nose portion overlaps the trailing ends of the adjacent lug pair a distance from 0.05 to 0.2 times the tread width.

* * * * *